United States Patent [19]

Sumiyoshi

[11] Patent Number: 4,652,940
[45] Date of Patent: Mar. 24, 1987

[54] METHOD OF IDENTIFYING MAGNETIC TAPE AS TAPE FOR JOURNAL

[75] Inventor: Takashi Sumiyoshi, Yokohama, Japan

[73] Assignee: Hitachi, Ltd., Tokyo, Japan

[21] Appl. No.: 536,875

[22] Filed: Sep. 29, 1983

[30] Foreign Application Priority Data

Sep. 30, 1982 [JP] Japan ............... 57-172140

[51] Int. Cl.⁴ .................. G11B 5/00; G06F 15/30; G06F 7/00
[52] U.S. Cl. .................. 360/5; 364/406; 235/379
[58] Field of Search ........ 360/5; 364/401, 405; 235/408, 379

[56] References Cited

U.S. PATENT DOCUMENTS

| | | | |
|---|---|---|---|
| 3,321,747 | 5/1967 | Adamson | 364/200 |
| 3,801,963 | 4/1974 | Chen | 360/5 X |
| 3,852,571 | 12/1974 | Hall et al. | 235/379 |
| 3,904,860 | 9/1975 | Huber et al. | 360/5 X |
| 3,959,778 | 5/1976 | Brette | 364/200 |
| 3,973,237 | 8/1976 | Sawaguchi et al. | 235/371 |
| 4,306,299 | 12/1981 | Check, Jr. et al. | 364/900 |
| 4,316,248 | 2/1982 | Petter | 364/200 |
| 4,355,369 | 10/1982 | Garvin | 235/379 |
| 4,404,649 | 9/1983 | Nunley et al. | 235/379 |
| 4,458,307 | 9/1984 | McAnlis et al. | 364/200 |
| 4,517,663 | 5/1985 | Imazeki et al. | 371/13 X |
| 4,523,295 | 6/1985 | Zato | 364/900 |

*Primary Examiner*—Raymond F. Cardillo
*Assistant Examiner*—Alyssa H. Bowler
*Attorney, Agent, or Firm*—Antonelli, Terry & Wands

[57] ABSTRACT

In the on-line system, information called journal indicative of the hysteresis of process are written in turn in magnetic tape. At each process, journal information is added with information indicative of journal and the date on which the journal information was written. At the time of system resuming process after system down, the information added to journal at each process is read in order that the magnetic tape being read is decided to have recorded thereon the journal to be used for the system resuming process.

3 Claims, 15 Drawing Figures

FIG. 7

| | SIZE | PROPERTY |
|---|---|---|
| BLOCK LENGTH | 2 | B |
| SPARE | 2 | B |
| RECORD LENGTH | 2 | B |
| SPARE | 3 | B |
| 23 — ID(F) | 1 | C |
| SPARE | 2 | B |
| 24 — DATE | 4 | B |
| DEPOSIT FILE NAME | 8 | C |
| ACCOUNT NUMBER | 10 | C |
| 26 — INFORMATION BEFORE PROCESS — DATA LENGTH ($l_1$) | 2 | B |
| 26 — INFORMATION BEFORE PROCESS — BALANCE BEFORE PROCESS | $l_1$ | — |
| 27 — INFORMATION AFTER PROCESS — DATA LENGTH ($l_2$) | 2 | B |
| 27 — INFORMATION AFTER PROCESS — BALANCE AFTER PROCESS | $l_2$ | — |

FIG. 8

PJ FORMAT

| | BLOCK LENGTH | SPARE | RECORD LENGTH | SPARE | ID (P) | SPARE | DATE |
|---|---|---|---|---|---|---|---|
| SIZE | 2 | 2 | 2 | 3 | 1 | 2 | 4 |
| PROPERTY | B | B | B | B | C | B | B |

FIG. 9

OJ FORMAT

| | BLOCK LENGTH | SPARE | RECORD LENGTH | SPARE | ID (O) | SPARE | DATE | TERMINAL NAME | RESPONSE DATA INFORMATION | |
|---|---|---|---|---|---|---|---|---|---|---|
| | | | | | | | | | DATA LENGTH (ℓ) | RESPONSE DATA |
| SIZE | 2 | 2 | 2 | 3 | 1 | 2 | 4 | 8 | 2 | ℓ |
| PROPERTY | B | B | B | B | C | B | B | C | B | — |

FIG. 10

AJ FORMAT

| | BLOCK LENGTH | SPARE | RECORD LENGTH | SPARE | ID (A) | SPARE | DATE | TERMINAL NAME |
|---|---|---|---|---|---|---|---|---|
| SIZE | 2 | 2 | 2 | 3 | 1 | 2 | 4 | 8 |
| PROPERTY | B | B | B | B | C | B | B | C |

METHOD OF IDENTIFYING MAGNETIC TAPE AS TAPE FOR JOURNAL

BACKGROUND OF THE INVENTION

This invention relates to on-line data processing systems and more particularly to the control for reading a magnetic tape for a recorded journal in which a hysteresis of process is recorded, at the time of a system resuming its processing after the system has failed and was restored to the normal state.

In an on-line data processing system, it is a general practice that the historical information (journal) of the processes executed therein is recorded by a magnetic tape unit.

The journal thus obtained is used chiefly for the system resuming process after the system has failed and was restored to the normal state.

The on-line data processing system performs such processes as reading a file (collected information for an object stored in a magnetic disk unit, magnetic tape unit or the like), updating the file and so on. If a failure occurs in the hardware or software of the system, the process may be stopped. At this time, the failure is removed by proper processing and the system is again started to operate. Before execution of a process, a process (system resuming process) is necessary to make the contents of the file appropriate by using the journal. In addition, to read the journal, it is absolutely necessary to fully check the magnetic tape loaded on the magnetic tape unit for a desired journal recorded therein, because the operator may have loaded an improper magnetic tape on the unit.

In general, checking of what information is recorded on the magnetic tape has so far been performed by reading out information, calling label, recorded at the beginning of the tape.

Furthermore, to restore the file to a proper state, it is necessary to first read the most recent journal.

Therefore, after the magnetic tape is rewound to its beginning where the label is read, and the presence of a proper journal is confirmed, the tape must be wound forward until the most recent journal recorded portion is read out. For this process, a time of the order of minutes is required. This means that the start of process execution is delayed by that time.

SUMMARY OF THE INVENTION

Accordingly, it is an object of the invention to quickly determine that the magnetic tape being read has a proper journal recorded therein.

According to this invention, information is provided indicative of whether the magnetic tape has a proper journal recorded therein, as part of each journal data record, and in the system resuming process, checking is made of the journal closest to the head position at the time of system failure.

BRIEF DESCRIPTION OF THE DRAWINGS

FIG. 7 shows one example of a journal data record in one embodiment of this invention;

FIGS. 8, 9 and 10 show other examples of a journal data record in one embodiment of this invention.

DESCRIPTION OF THE PREFERRED EMBODIMENT

One embodiment of the invention in such an on-line system as is used in banks will be described below.

Figure 1:
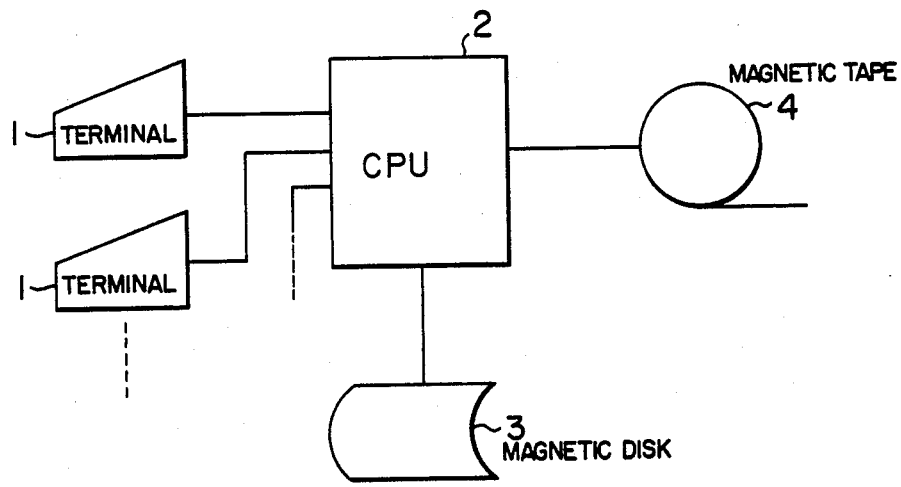
FIG. 1 is a schematic diagram of an on-line system.
Figure 3:
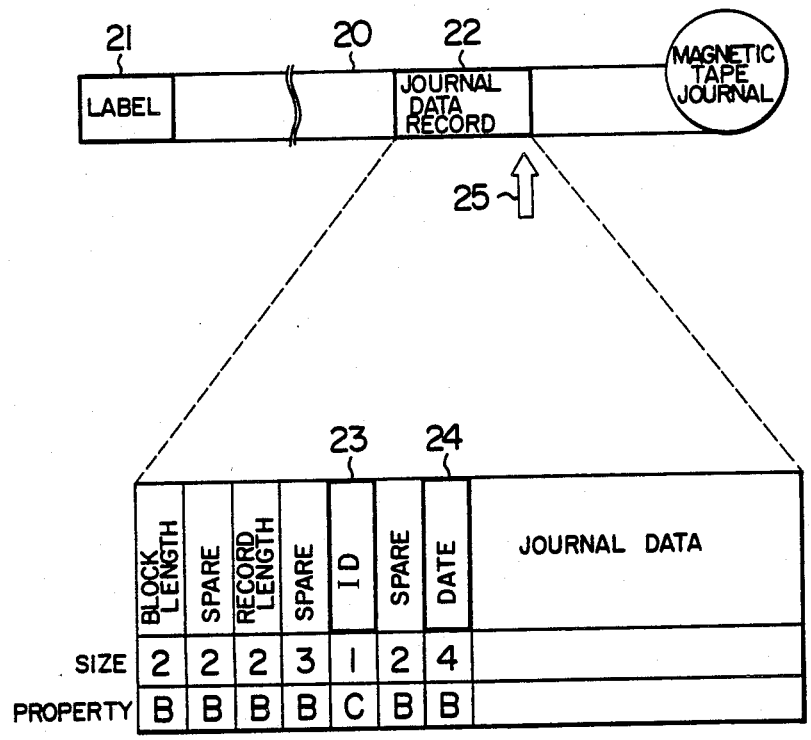
FIG. 3 shows an example of a journal in one embodiment of this invention.
Figure 2:
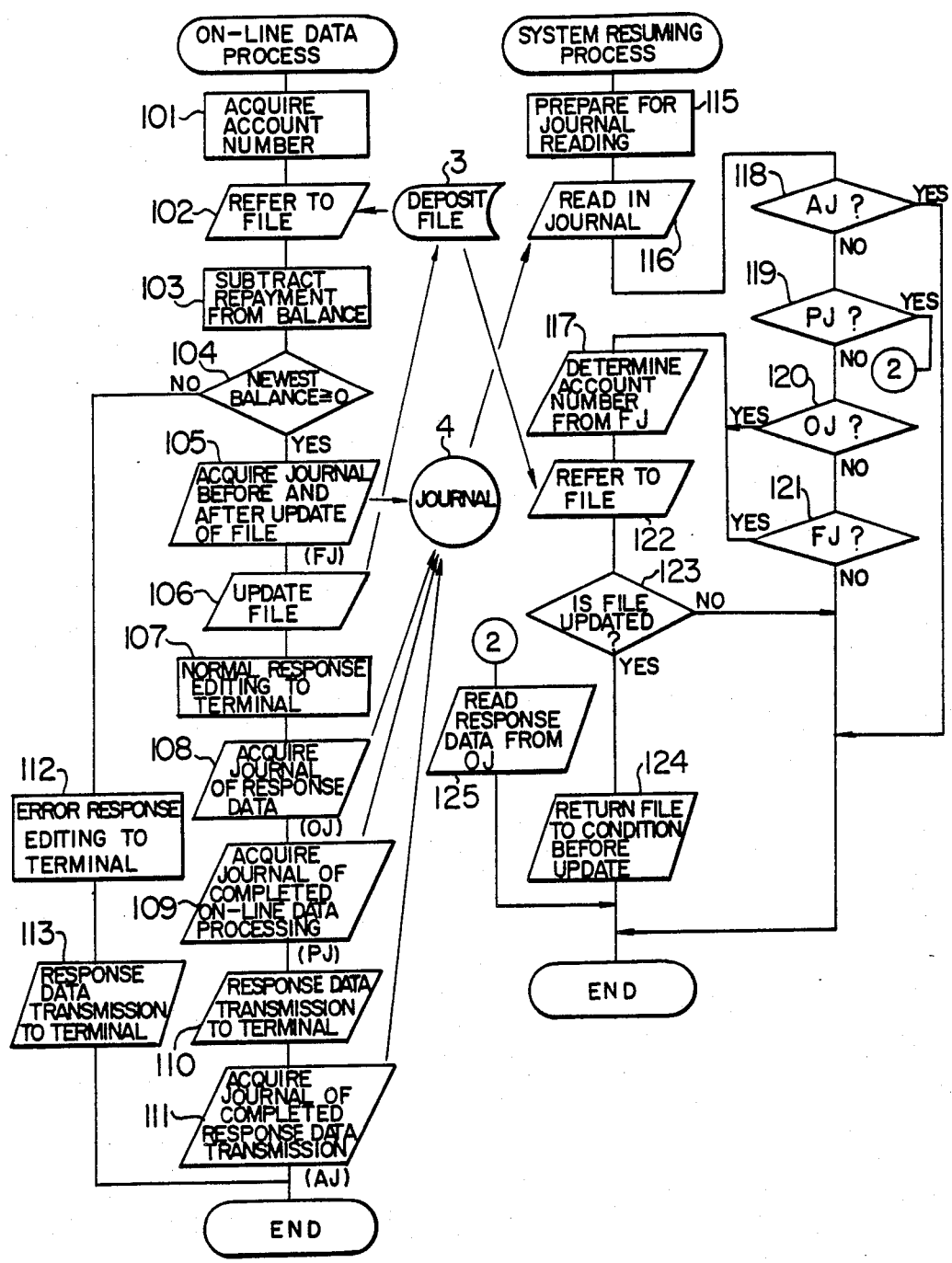
FIG. 2 is a flow chart of a process forming one embodiment of this invention.
Figure 4:
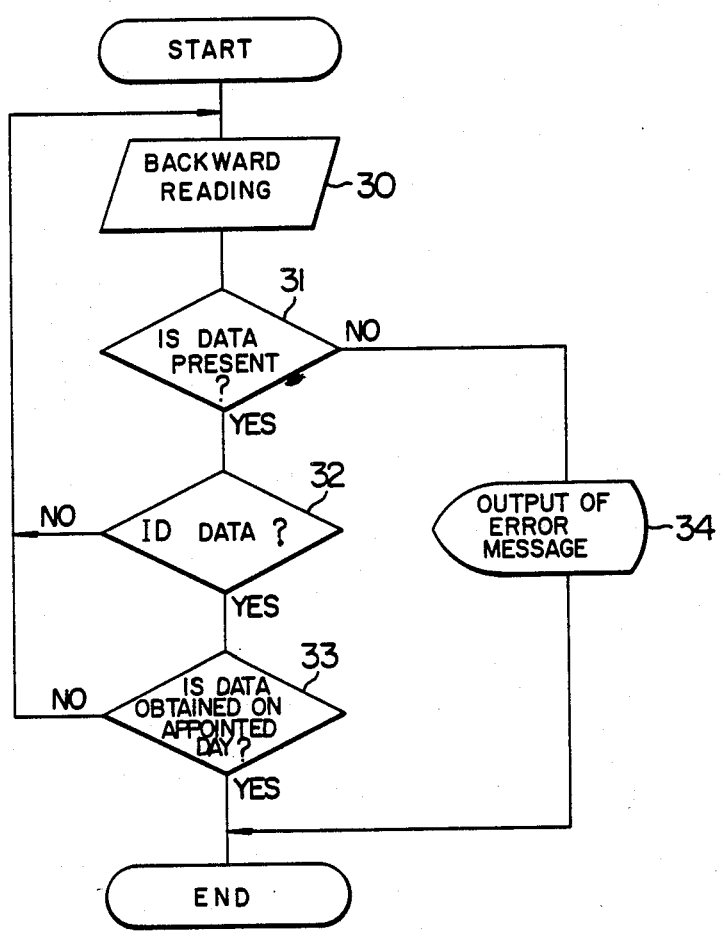
FIG. 4 is a flow chart of the process for journal reading preparation in FIG. 2.

FIG. 1 is a schematic block diagram of an on-line system. Referring to FIG. 1, there are shown terminals 1 corresponding to the window equipment or automatic money-receiving and -repaying equipment installed at each branch in the on-line system of banks. These terminals 1 are connected to a central processing unit 2 through communications channels. The central processing unit 2 is also connected to magnetic disk equipment 3 in which data (file) for each customer is stored, and to magnetic tape equipment 4 in which a journal is stored. FIG. 2 shows a process flow to be executed in the on-line system. Before describing this process, we will explain examples of a journal and a file. FIG. 3 shows an example of a magnetic tape for a journal according to this invention. As in the general magnetic tape for a journal, label information 21 is stored on the beginning portion of a magnetic tape 20 and many journal data records 22 are stored in turn in the following tape portion. The format of the journal data record 22 according to this invention, as illustrated, has control information from block length to date and the following journal data. However, there is sometimes no journal as will be described later. One of the features of this invention is to have ID23 indicative of a journal data record and the types of journal and date 24 indicative of the data of the journal acquisition.

Figure 5A:
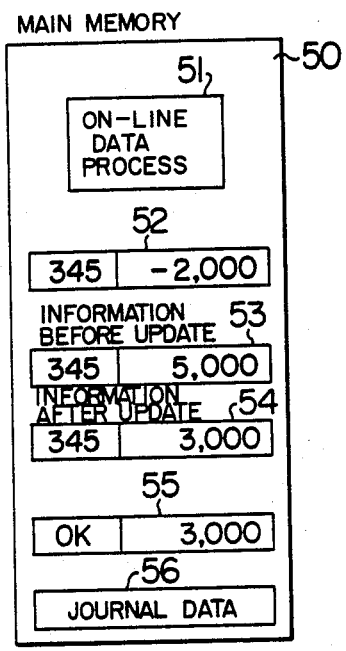
FIG. 5a shows one example of the state of a main memory unit within a central processing unit in one embodiment of this invention.

FIG. 5a shows the state in which information is stored in a main memory 50 within the central processing unit 2. Numeral 51 represents a program for executing the on-line process of FIG. 2. The instructions of this program are sequentially read and executed to operate the central processing unit 2, in performing the process. The program for the system resuming process is stored in the magnetic disk unit. When the system resuming process is required to be executed, the program is loaded in the main memory unit 50. The data inputted from the terminals 1, data read from the file, data after processing and so on are stored in the main memory unit 50.

Figure 5B:
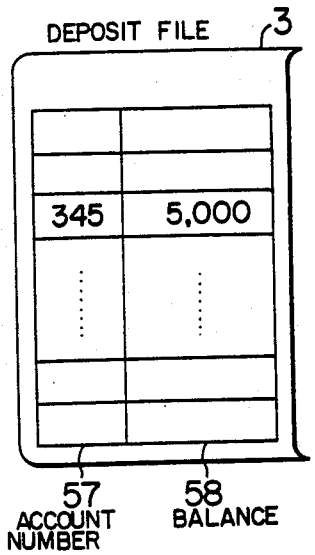
FIG. 5b shows one example of a file in one embodiment of this invention.

FIG. 5b shows the deposit file stored in the magnetic disk unit 3, which includes account number 57 and balance 58.

Figure 6:
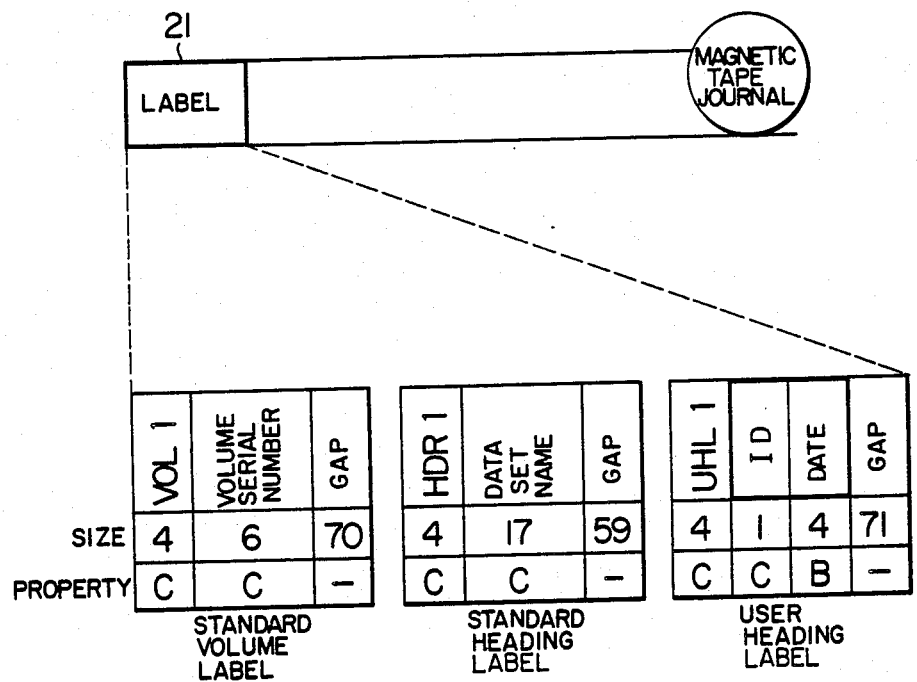
FIG. 6 shows a general format of the label on the magnetic tape.

FIG. 6 illustrates the general format of a label including the volume serial number, the data set name, and the above-mentioned ID and date.

Now, the on-line data process will be described with reference to FIG. 2. Discrimination indicator (−) as a request for withdrawal of funds, account number for the withdrawal and the amount of money to be paid are transferred as input data 52 from terminal 1 to central processing unit 2 and stored in the main memory unit 50.

The input data 52 is delivered to the in-line data process program 51 on the central processing unit 2 together with the window or terminal name. In the on-line data process, the account number is obtained from the input data 52 (at step 101). Then, a deposit file 3 is referred to and the corresponding account data 53 is read (at step 102).

In order to update the account data 53, the data 53 is transferred to area 54 and the amount to be paid for the input data 52 is subtracted therefrom (at step 103). If the balance of the updated information 54 is less than zero under which the withdrawal of deposit is impossible, an error response to the window equipment 1 is generated (step 112) and response data is transmitted (step 113).

If the balance of the updated information 54 is larger than zero, under which condition the withdrawal is possible, the updated information 54 is written in the deposit file in place of the nonupdated information 53 and the updated information 54 is edited in the format shown in FIG. 7 and stored as journal data 56 in the magnetic tape unit 4 (step 105). This is called FJ (file journal).

The file journal of FIG. 7, of course, follows the format of the journal data record and includes the deposit file name, account number, non-processed information 26 (nonupdated information 53), and processed information 27 (updated information 54).

Thereafter, the updated information 54 is written in the file 3 to thereby update the file 3 (step 106).

After completion of updating the deposit file 3, normal response 55 to the terminal 1 is edited (step 107). This normal response 55 is also edited together with the terminal name in the format shown in FIG. 9 and written in the journal 4 (step 108). This is called OJ (output journal).

Then, the journal indicative of the completion of one on-line data process is edited in the format shown in FIG. 8 and written in the journal 4. This is called PJ (process journal).

Finally, the normal response 55 is transmitted to the terminal 1. When the transmission is completed, the journal to the effect that the response data transmission is completed is edited in the format shown in FIG. 10 and is obtained. This is called AJ (acknowledgement journal). These 4 different journals are stored in the order of their occurrence and discriminated by the ID as described above.

The terminal then pays money in accordance with the response.

The condition of the on-line system at the time of failure will be described with reference to FIGS. 2, 4 and 11a to 11d.

When the system is resumed after occurrence of system failure, it is a general practice that the operator directs the system to resume process through the system control. If this is done, a system resume process program is loaded into the main memory unit, and executed (at step 115). First, the preparation for reading the journal is made. This process is important in this invention, as illustrated in detail in FIG. 4. First, backward reading is performed from the record closest to the magnetic head (at step 30). That is, data is read from the magnetic tape running backward, or in the opposite direction to the writing direction, as is already known; or a sequence of information written is read from the back portion to the front portion.

Then, it is checked whether the read data is present or not (step 31). If the data is present, checking is made of whether the magnetic tape is journal data set, by the ID information 23 within the data (step 32). If the decision is YES, it is checked by the data information 24 whether the data is data which is to be processed and which was obtained on the appointed day (step 33). Since it is confirmed at the end of each day that the completion of process and file are correct, the journal data before the previous day is not necessary.

If the result of the checking is YES, the checking of the magnetic tape for propriety is finished. If the decision either at step 32 or 33 is NO, the journal record therebefore is read in by backward reading, and the magnetic tape is checked for propriety. If at step 31 no data is detected, the central processing unit supplies an error message to the display unit or the like (step 34). The operator, when looking at the display, sets another magnetic tape in the tape unit.

The magnetic tape is then checked for propriety again in accordance with the above procedure.

It will be understood from the above description that it is not necessary to rewind to the label and then wind to the newest journal record so that the process can be performed at high speed.

Then, the journal is read in (step 116), and the resuming process proceeds.

The on-line system may go down at any step in the on-line data process. If it occurs between steps 106 and 110 in FIG. 2, there is caused the situation that the balance in the deposit file 3 is updated but no money is paid by the terminal.

In order to avoid such a condition, the system resuming process determines when the on-line system has gone down, in accordance with the contents of the journal 4 and removes it. The method for determination will be described below.

At the time of the process for resuming the on-line system operation, the journal takes one of four possible states which are identified at decision steps 118 to 121. The state of FIG. 11a occurs after the step 111 or before the step 106 and no contradiction is caused, therefore nothing is done. The state of FIG. 11b occurs between the steps 109 and 111 of FIG. 2 and there the system has gone down at a time when the response data 55 is not transmitted to the terminal 1. Thus, to prepare for the request of resending the response data by the operator of the terminal, the response data on OJ 85 is read in as response data 55.

Figure 11A:
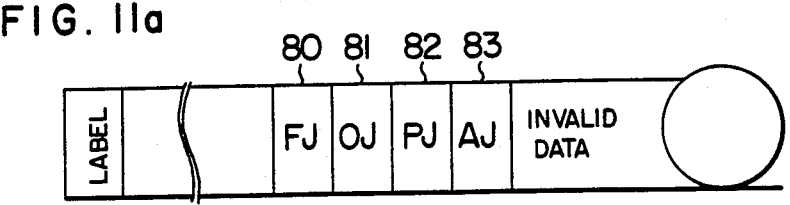
FIGS. 11a to 11d show examples of the state in which journals have been obtained.
Figure 11B:
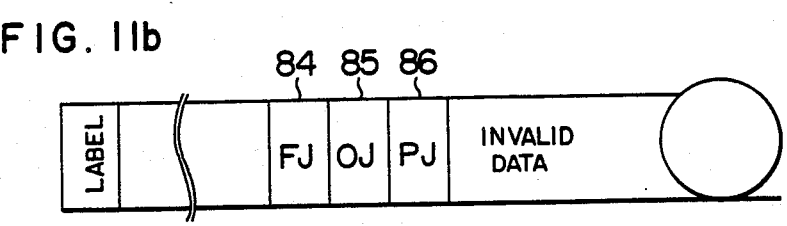
Figure 11C:
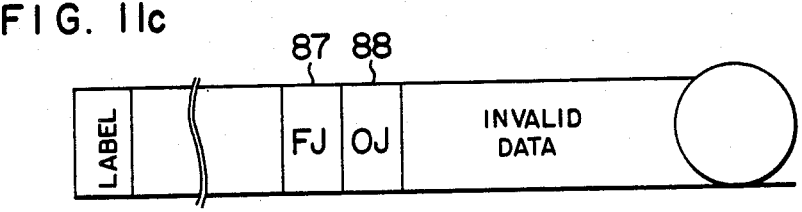

The state of FIG. 11c occurs between the steps 108 and 109 of FIG. 2 and the newest record ID shows OJ. Since PJ is not obtained, the on-line data process is treated as being incomplete. In other words, since the update of the deposit file 3 at step 106 is invalid, the state before update is returned to on FJ 87 at step 124 of FIG. 2.

Figure 11D:
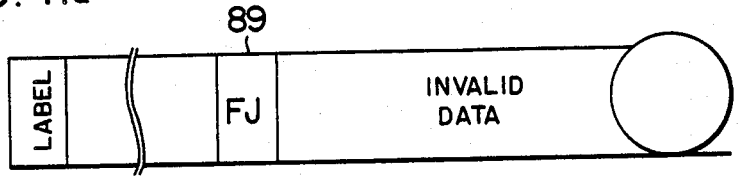

The condition of FIG. 11d is caused between the steps 106 and 108 in FIG. 2 and shows a case where the system has gone down. First, FJ is detected. Since PJ is not detected, the on-line data process is treated as being incomplete. That is, since the update of the deposit file at step 106 is invalid, the state before update is returned to on FJ 89 at step 124 in FIG. 2.

The process for resuming the system operation is finished.

Thereafter, the on-line data process program 51 is again executed.

I claim:

1. A method of identifying a recorded journal on a magnetic tape being read out in an on-line system, comprising the steps of:
   (a) writing on a magnetic tape a journal including journal data for a plurality of transactions which are executed in said one-line system and each of which has a multi-step process, the journal data for each transaction having a plurality of journal records which are historical information indicative of the results at respective steps of the multi-step process in that transaction, the historical information at each journal record being written together with control information including at least identification information indicating that data written in said magnetic tape is historical information, each time a selected step of the multi-step process is executed;
   (b) reading any given magnetic tape which is loaded on a magnetic tape unit of said on-line system when a process for resuming operation of said on-line system after system failure is performed, said data read in sequence from a part of said any given magnetic tape which can be first read; and
   (c) detecting said identification information from the read data to determine whether or not said any given magnetic tape loaded on said magnetic tape unit is a tape having a desired journal in which the historical information to be used for said system resuming process is included, whereby the determination of whether or not said any given magnetic tape loaded on said magnetic tape unit is the tape having the desired journal can be made without a need of rewinding said any given magnetic tape to a heading portion thereof.

2. A method according to claim 1, wherein said control information further includes date information indicative of the date on which said historical information is written in said magnetic tape at said step (a), and at said step (c) said date information is detected in addition to the detection of said identification information and said any given magnetic tape loaded on said magnetic tape unit is determined as being the tape having the desired journal when the detected date information indicates the most recent date.

3. A method according to claim 2, wherein at said step (b) said any given magnetic tape loaded on said magnetic tape unit is read in a direction opposite to a direction in which data was written.

* * * * *